US012777092B2

(12) United States Patent
Khan et al.

(10) Patent No.: US 12,777,092 B2
(45) Date of Patent: Oct. 27, 2026

(54) SYSTEMS AND METHODS FOR FAST SYNCHRONIZATION AND STARTUP OF NEW BLOCKCHAIN NODE

(71) Applicant: Verizon Patent and Licensing Inc., Basking Ridge, NJ (US)

(72) Inventors: Ahmed A. Khan, Plano, TX (US); Mohammed Alsadi, Redmond, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 31 days.

(21) Appl. No.: 19/074,671

(22) Filed: Mar. 10, 2025

(65) Prior Publication Data

US 2026/0270311 A1 Sep. 10, 2026

(51) Int. Cl.
*H04L 67/1095* (2022.01)
*H04L 9/00* (2022.01)

(52) U.S. Cl.
CPC ........... *H04L 67/1095* (2013.01); *H04L 9/50* (2022.05)

(58) Field of Classification Search
None
See application file for complete search history.

(56) References Cited

U.S. PATENT DOCUMENTS

2020/0195441 A1* 6/2020 Suen .................. G06F 16/1805
2021/0149775 A1* 5/2021 Novotny ............ G06F 11/1451

FOREIGN PATENT DOCUMENTS

CN 118101677 A * 5/2024 .......... H04L 63/123

* cited by examiner

*Primary Examiner* — Boris D Grijalva Lobos

(57) ABSTRACT

A system described herein may maintain a local copy of a particular blockchain that is associated with a plurality of nodes of a blockchain network. Each node of the plurality of nodes may maintain a respective local copy of the particular blockchain. The system may maintain world state information associated with the particular blockchain; receive a request from a device to join the blockchain network; and provide, to the device and based on the received request, at least a subset of the world state information associated with the particular blockchain. The device may perform blockchain operations, such as executing chaincode, based on the at least the subset of the world state information. The system may provide, to the device and after providing the at least the subset of the world state information, the local copy of the particular blockchain, such as by performing a prioritized synchronization operation.

20 Claims, 10 Drawing Sheets

301

| Parameter | Sync state/priority |
|---|---|
| Param_1 | Synced |
| Param_2 | Synced |
| Param_3 | Prio_1 |
| Param_4 | Prio_2 |
| Param_5 | Synced |
| Param_6 | Prio_1 |
| Param_7 | Prio_1 |
| Param_8 | Prio_2 |

SYSTEMS AND METHODS FOR FAST SYNCHRONIZATION AND STARTUP OF NEW BLOCKCHAIN NODE

BACKGROUND

Blockchains provide for the decentralized and secure storage of data, decentralized computing, or other technical operations. Blockchains may further provide for the immutability of recorded data (e.g., as maintained by computing devices that implement nodes), as data may not be altered once recorded to a blockchain. Blockchains may be maintained by multiple nodes, such as geographically distributed or otherwise distinct servers, workstations, etc., that each maintain local copies of respective blockchains, perform computing operations based on information (e.g., executable code, instructions, variables, etc.) recorded to respective blockchains, and/or perform other operations. In order to perform operations related to maintaining a blockchain, such as executing chaincode that references data recorded to the blockchain, a node may need to have received the data referred to by the chaincode. During an initial configuration or provisioning of a new node (e.g., adding a node to a blockchain network that maintains a particular blockchain), the new node may not have a full set of blockchain data for a relatively long time (e.g., hours or days), as blockchain data may be relatively large and may consume copious amounts of time and/or network resources to provide to the new node.

DETAILED DESCRIPTION OF EXAMPLE EMBODIMENTS

The following detailed description refers to the accompanying drawings. The same reference numbers in different drawings may identify the same or similar elements.

Embodiments described herein provide for a fast synchronization (or "sync") operation for a new node of a blockchain network, which reduces the time needed for the new node to be operational. For example, as discussed herein, the fast synchronization operation may facilitate the new node being available to perform blockchain operations such as executing chaincode, participating in consensus mechanisms, or the like, sooner (e.g., faster) than implementations that do not make use of such techniques, thereby enhancing the overall performance of the blockchain network.

Figure 1:
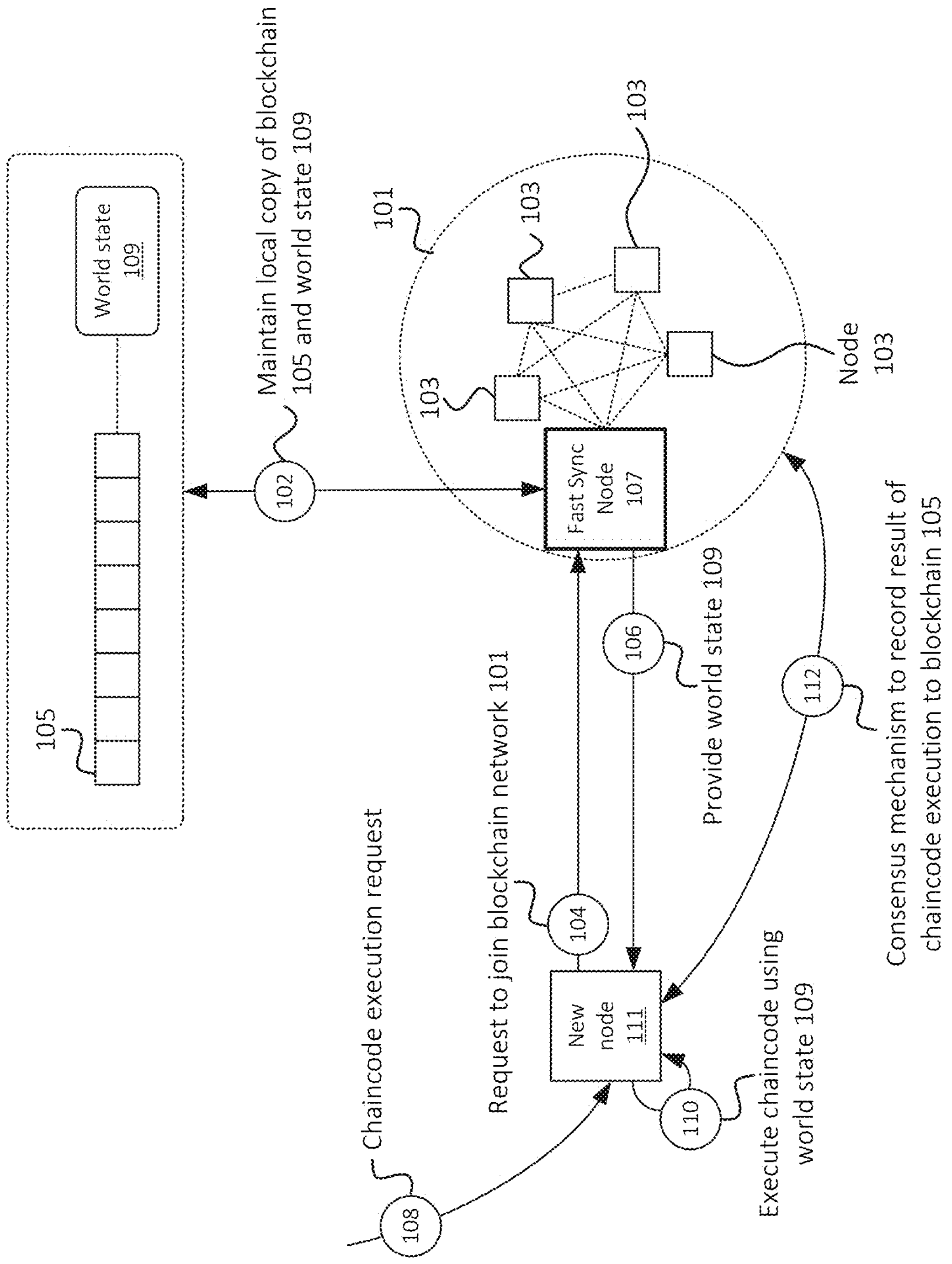
FIGS. 1 and 2 illustrate example overviews of one or more embodiments described herein.

As shown in FIG. 1, blockchain network 101 may include a set of nodes 103. Nodes 103 may include devices or systems such as geographically distributed or otherwise distinct servers, workstations, etc., that communicate with each other to maintain blockchain 105. For example, nodes 103 may maintain local copies of blockchain 105, and changes to blockchain 105 (e.g., adding blocks based on computations, chaincode operations, or other suitable operations by one or more nodes 103) may be subject to satisfying a consensus mechanism implemented by blockchain network 101. As discussed below, the consensus mechanism may include multiple nodes 103 validating, approving, confirming, etc. the results of executing a requested operation or set of operations (e.g., chaincode operations) prior to such results being recorded or committed to blockchain 105.

For example, multiple nodes 103 may perform a particular set of operations (e.g., chaincode) and may compare the different respective results from the multiple nodes 103 in order to form a consensus as to the result of performing the particular set of operations. In situations where a consensus is reached (e.g., where at least a threshold quantity of nodes 103 confirm or validate a particular result), the result may be recorded to blockchain 105.

In accordance with some embodiments, blockchain network 101 may also include Fast Sync Node ("FSN") 107, which may facilitate the fast synchronization and startup of new nodes to be added to blockchain network 101. In some embodiments, FSN 107 may include some or all of the functionality of a particular node 103, as well as additional functionality described herein. In some embodiments, blockchain network 101 may include a single FSN 107. In some embodiments, blockchain network 101 may include multiple FSNs 107. In some embodiments, some or all nodes 103 of blockchain network 101 may implement some or all of the functionality of FSN 107.

As noted above, nodes 103 as well as FSN 107 may each maintain (at 102) a local copy of blockchain 105. Blockchain 105 may, for example, include one or more records or blocks, including a "genesis" block (e.g., an initial block of blockchain 105) as well as one or more other blocks that refer to or are based on the genesis block. Blockchain 105 may include data, records, values, variables, chaincode (e.g., executable code or other information that specifies operations to perform on a given set of inputs in order to generate a corresponding set of outputs), or the like.

FSN 107 and/or one or more other nodes may further maintain world state information 109, which may include a portion or subset of the information included in blockchain 105, and/or which may otherwise be derived from or based on blockchain 105. In one example, blockchain 105 may include multiple versions of a particular variable or parameter, such as a monitored value that changes over time. As another example, blockchain 105 may include multiple versions of particular chaincode (e.g., multiple different versions, such as updated versions, of a specified set of operations to perform on a given set of inputs). As yet another example, different records may reflect different owners (e.g., past owners and a present owner) of a particular asset such as a Non-Fungible Token ("NFT"), where the different owners own the NFT through exchanges or trades. World state information 109 may reflect "latest" or otherwise valid information specifying a current version of variables, parameters, chaincode, owner of an asset, etc. In this sense, world state information 109 may include a "digest" or otherwise reflect the current state of values, variables, etc. reflected in blockchain 105, without necessarily including all information associated with such values, variables, etc., such as metadata, past versions, etc.

In accordance with some embodiments, FSN 107 may receive (at 104) a request from new node 111 to join blockchain network 101. For example, FSN 107 may provide an application programming interface ("API"), a portal, or some other suitable communication pathway via which new node 111 may communicate with FSN 107 to join blockchain network 101. In some embodiments, FSN 107 may perform additional operations not discussed in detail here (e.g., operations in addition to facilitating a fast synchronization of new node 111), such as providing images, configuration files, software development kit ("SDK") information, network information, and/or other suitable information to facilitate the configuration of new node 111 (e.g., to ultimately serve as a node of blockchain network 101). In accordance with some embodiments, based on the request (at 104) to join blockchain network 101, FSN 107 may provide (at 106) world state information 109 to new node 111.

Based on receiving world state information 109, new node 111 may have possession of all "relevant" information included in blockchain 105, such as current, valid, etc. versions of values, parameters, variables, chaincode, etc. of blockchain 105. Because world state information 109 does not include all of the information of blockchain 105 (e.g., does not include some or all metadata, block hashes, blocks with outdated information, etc.), providing (at 106) world state information 109 may consume fewer network resources and may be able to be accomplished potentially orders of magnitude faster than performing a full synchronization or transfer of blockchain 105 to new node 111. In this sense, new node 111 may be able to process some, if not all, of the functionality of nodes 103 with respect to serving as a node of blockchain network 101.

For example, new node 111 may receive (at 108) a request to execute particular chaincode with respect to blockchain 105. For example, new node 111 may receive a request to execute one or more operations, that are specified in blockchain 105 (e.g., where such operations or chaincode are included in world state information 109). Additionally, or alternatively, new node 111 may receive a request to execute one or more operations (e.g., as chaincode) that utilize (e.g., as input to the chaincode) values, variables, parameters, etc. that are included in blockchain 105. In the event that the request specifies that current or valid versions of such values, variables, parameters, etc. be used, all of such values, variables, parameters, etc. may be present in world state information 109. As such, even in situations where new node 111 does not yet have a full local copy of blockchain 105 (e.g., has received world state information 109 but has not yet received a full copy of blockchain 105), new node 111 may still be able to perform full functionality using the information included in world state information 109.

New node 111 may execute (at 110) the requested chaincode using the information included in world state information 109. For example, the request may include a chaincode identifier or name, and new node 111 may identify specific executable code, operations, etc. associated with the chaincode as indicated in world state information 109. Additionally, or alternatively, the request may specify particular variables, parameters, etc. (e.g., as input parameters for the chaincode), for which world state information 109 includes a current version or otherwise valid information for such variables, parameters, etc. New node 111 may generate one or more outputs (e.g., a result) based on executing the chaincode. As discussed above, new node 111 may execute the chaincode and generate the result without having received a full copy of blockchain 105, at least by virtue of world state information 109 including the information necessary to execute the requested chaincode.

New node 111 may further be able to participate (at 112) in a consensus mechanism with some or all of the other nodes 103 of blockchain network 101, in order to ultimately record, commit, etc. the result of executing the chaincode to blockchain 105. In this sense, new node 111 may be able to serve as a node of blockchain network 101 for purposes such as executing chaincode with respect to blockchain 105, providing information such as current versions of values or variables stored in blockchain 105, or other functions, without having received a full local copy of blockchain 105.

Figure 2:
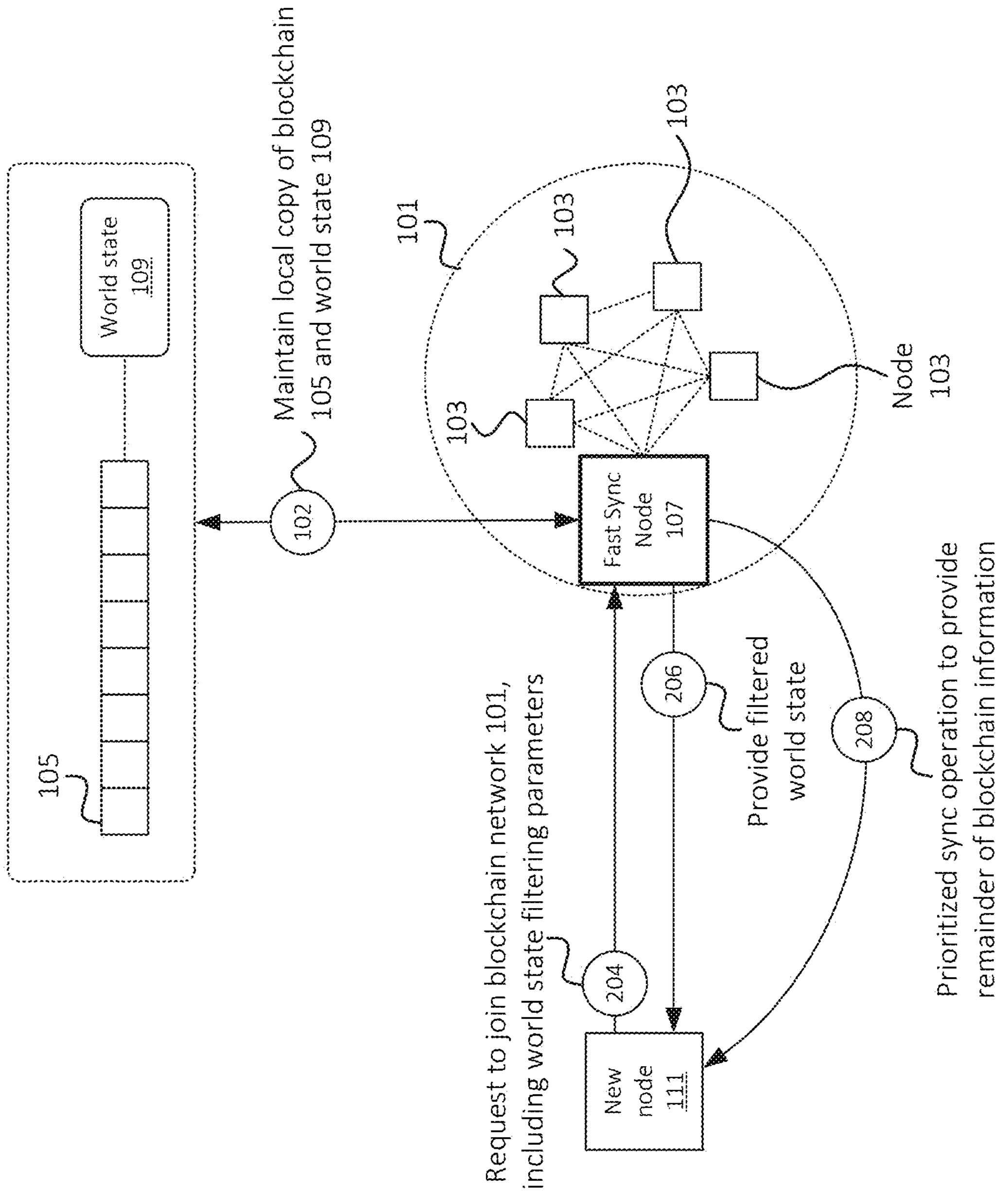

In some embodiments, instead of providing (at 106) full world state information 109, FSN 107 may provide a subset of world state information 109 or a filtered version of world state information 109. For example, as shown in FIG. 2, FSN 107 may receive (at 204) a request from new node 111 to join blockchain network 101. In some embodiments, the request may specify filtering parameters, such as conditions, criteria, etc. that specify particular values, parameters, variables, etc. that should be provided to new node 111 and/or that should not be provided to new node 111 as part of a fast synchronization and/or startup operation for new node 111. In one example scenario, a user or administrator associated with new node 111 may specify particular variables, parameters, etc. that should be provided to new node 111 as part of the fast synchronization and/or startup operation, where such variables, parameters, etc. may be relatively likely to be indicated in subsequent chaincode requests. For example, chaincode related to core functionality of blockchain 105, variables or values that have received frequent updates, variables or values indicated as high priority, and/or other suitable information included in world state information 109 may be specified in world state filtering parameters. Additionally, or alternatively, FSN 107 may identify a particular subset of world state information 109 (e.g., a filtered subset of world state information 109, also referred to as "filtered world state information") to provide to new node 111 in response to the request (at 204) to join blockchain network 101. As discussed above, the filtered world state information may be a subset of world state information 109 that is selected, determined, etc. based on filtering parameters or other suitable conditions, criteria, or techniques. In some embodiments, new node 111 and/or FSN 107 may utilize artificial intelligence/machine learning ("AI/ML") techniques to automatically identify particular parameters or values to include or to exclude in filtered world state information that is ultimately provided to new node 111.

FSN 107 may accordingly provide (at 206) filtered world state information to new node 111. As discussed above, the filtered world state information may include some, but not all, of the information in world state information 109. In this manner, providing (at 206) filtered world state information may consume even less time and/or network resources than providing full world state information 109 (e.g., at 106) to new node 111, thus allowing new node 111 to become operational even faster. In this manner, new node 111 may be able to perform chaincode and participate in consensus mechanisms in scenarios where the filtered world state information includes the information necessary to perform particular requested chaincode operations (e.g., based on particular parameters or values included in the filtered world state).

As discussed below, FSN 107 may further perform a prioritized synchronization operation to provide the remainder of the blockchain information to new node 111, which may include providing the remainder of world state information 109 (e.g., portions of world state information 109 that were not included in the filtered world state) and/or providing a full local copy of blockchain 105 to new node 111, in order to enable new node 111 to fully serve as a node of blockchain network 101. As reflected in data structure 301 of FIG. 3, assume that world state information 109 includes example parameters Param_1 through Param_8. Assume that Param_1, Param_2, and Param_5 are identified as a highest priority set of parameters, and are therefore synchronized with (e.g., provided to) new node 111 as part of providing (at 206) filtered world state information to new node 111. FSN 107 may identify one or more priority levels for the remaining parameters, where such priority levels may be determined based on factors such as likelihood of being needed for subsequent chaincode operations, data size or network resource consumption that would result from providing respective parameters to new node 111, and/or other suitable factors.

Figures 3, 4:
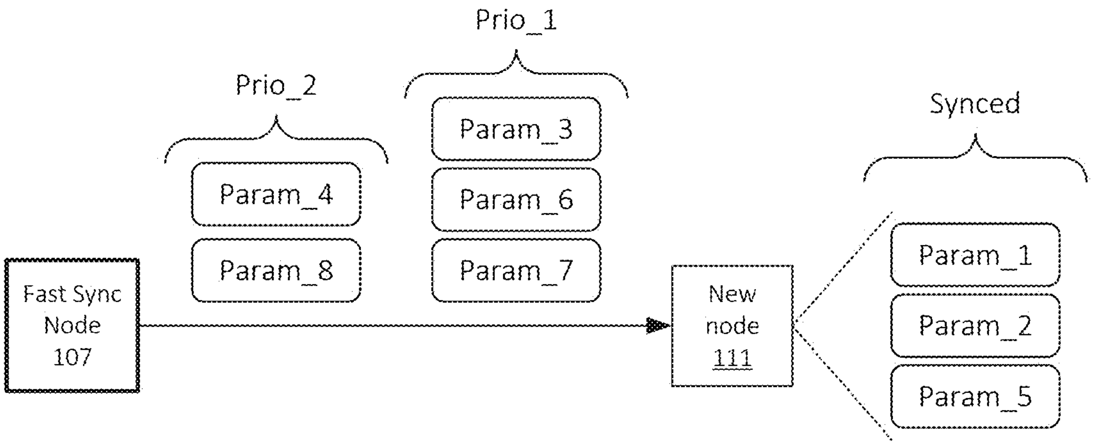
FIG. 3 illustrates an example prioritization of world state and/or blockchain parameters for a prioritized synchronization operation, in accordance with some embodiments.
FIG. 4 illustrates an example of providing world state and/or blockchain parameters as part of a prioritized synchronization operation, in accordance with some embodiments.

In this example, Param_3, Param_6, and Param_7 are identified as a highest priority of parameters that have yet to be synchronized (e.g., "Prio_1"), and Param_4 and Param_8 are identified as a lower priority of parameters that have yet to be synchronized (e.g., "Prio_2"). Thus, as shown in FIG. 4, at a particular point in time, new node 111 may have received Param_1, Param_2, and Param_5, and may not have yet received Param_3, Param_4, Param_6, or Param_7. When performing the prioritized synchronization operation (e.g., at 208), FSN 107 may first provide the higher priority parameters (e.g., Prio_1 parameters), and may subsequently provide the lower priority parameters (e.g., Prio_2 parameters).

Figure 5:
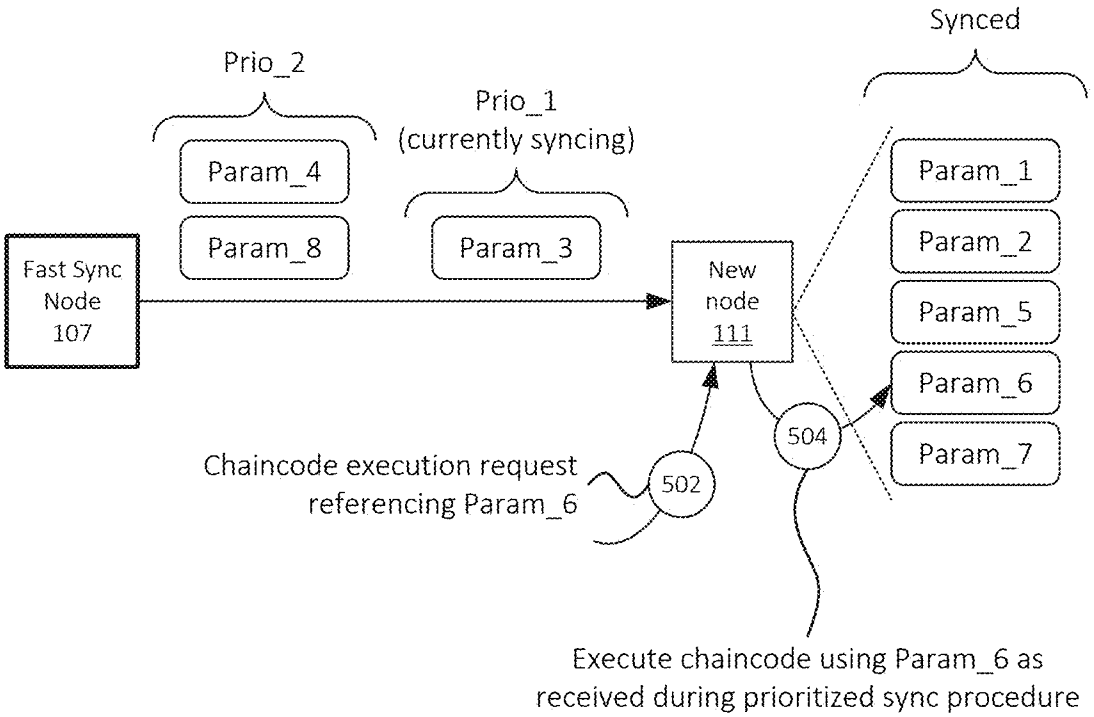
FIG. 5 illustrates an example of a new node being available to perform blockchain operations, such as executing chaincode, during a prioritized synchronization operation, in accordance with some embodiments.

In this manner, new node 111 may receive higher priority parameters faster than new node 111 receives lower priority parameters. In an implementation where likelihood of being needed for performing chaincode is a factor based on which the priority levels are determined, receiving higher priority parameters sooner than lower priority parameters may aid in new node 111 more quickly becoming functionally operational. For example, in the example scenario shown in FIG. 5, assume that FSN 107 is currently in the process of synchronizing Prio_1 parameters with new node 111, and has thus far provided the Prio_1 parameters Param_6 and Param_7 to new node 111.

During the prioritized synchronization operation, and after new node 111 has received some of the Prio_1 parameters, new node 111 may receive (at 502) a chaincode execution request that references one of the received Prio_1 parameters (i.e., Param_6, in this example). For example, Param_6 may include one or more input values for the chaincode, or may include the chaincode itself. Because new node 111 has received Param_6 prior to this request, new node 111 may be able to execute (at 504) the requested chaincode, using Param_6 which was received during the prioritized synchronization procedure. If Param_6 had not been prioritized in this manner, it is possible that new node 111 may not have yet received Param_6 before receiving (at 502) the chaincode execution request, and new node 111 may accordingly not have been able to execute (at 504) the requested chaincode.

In some embodiments, the prioritized synchronization operation may include providing the parameters as "off-chain" data or as world state information. For example, in some embodiments, the parameters provided during the prioritized synchronization operation may be used to augment or to generate complete world state information associated with blockchain 105, such that new node 111 has access to the complete world state information 109.

Figure 6:
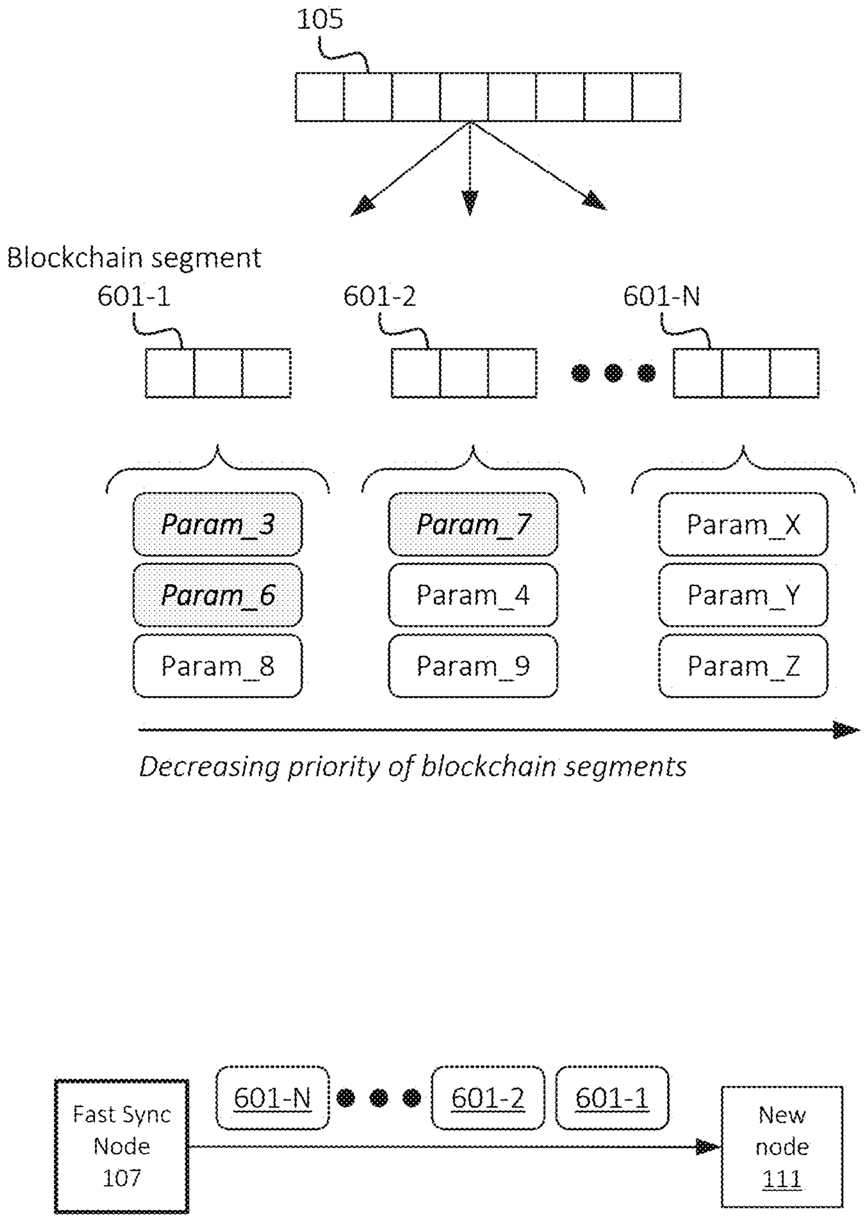
FIG. 6 illustrates an example of implementing a prioritized synchronization operation using blockchain segments, in accordance with some embodiments.

In some embodiments, in addition to or in lieu of providing the parameters as "off-chain" data or as world state information, FSN 107 may provide the parameters, in a prioritized manner, as blockchain information. For example, as shown in FIG. 6, FSN 107 may separate blockchain 105 into distinct blockchain segments 601 (e.g., blockchain segments 601-1, 601-2, 601-N, etc.). In some embodiments, FSN 107 may generate blockchain segments 601 based on a structure of blockchain 105, such as a Merkle tree structure of blockchain 105. For example, blockchain segment 601-1 may be or may represent a first Merkle subtree, blockchain segment 601-2 may be or may represent a second Merkle subtree, and blockchain segment 601-N may be or may represent an Nth Merkle subtree. In some embodiments, blockchain segments 601 may be generated or determined using some other suitable technique.

Continuing with the example parameter priorities discussed above, blockchain segment 601-1 may include information that includes multiple Prio_1 parameters, such as Param_3 and Param_6. Additionally, blockchain segment 601-2 may include a single Prio_1 parameter, and blockchain segment 601-N may include no Prio_1 parameters. FSN 107 may determine a relative priority of each respective blockchain segment 601 based on the priorities of the parameters or values indicated in such blockchain segments 601. For example, FSN 107 may determine an average priority, a weighted average priority, a quantity of high priority parameters, and/or other measures of priority for each blockchain segment 601 based on the parameters included in each blockchain segment 601. In this example, FSN 107 may determine that blockchain segment 601-1 is a highest priority segment, that blockchain segment 601-2 is a next highest priority segment, and that blockchain segment 601-N is the lowest priority segment.

Accordingly, as part of the prioritized synchronization operation, FSN 107 may provide the respective blockchain segments 601 in order of priority. For example, FSN 107 may provide blockchain segment 601-1 to new node 111 first, then blockchain segment 601-2, and blockchain segment 601-N last. In some embodiments, each blockchain segment 601 may be verified by new node 111, such as by determining a Merkle proof of each respective blockchain segment 601.

Figure 7:
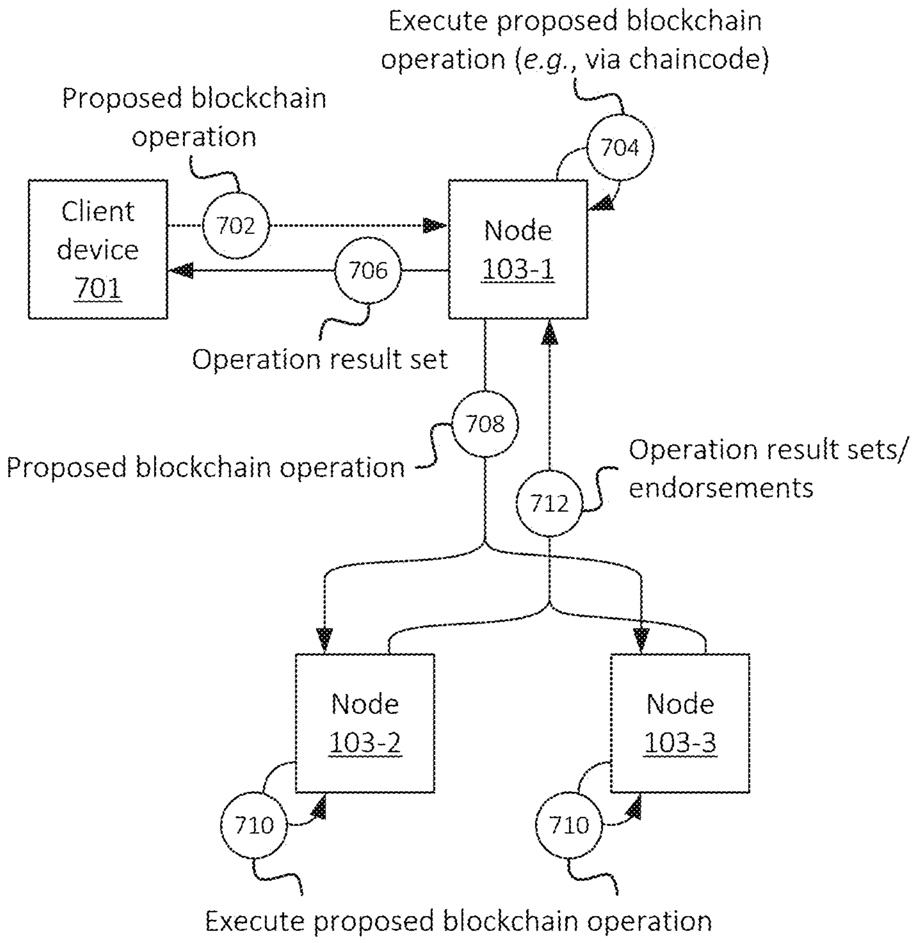
FIGS. 7 and 8 illustrate example operations associated with recording information to a blockchain, in accordance with some embodiments.
Figure 8:
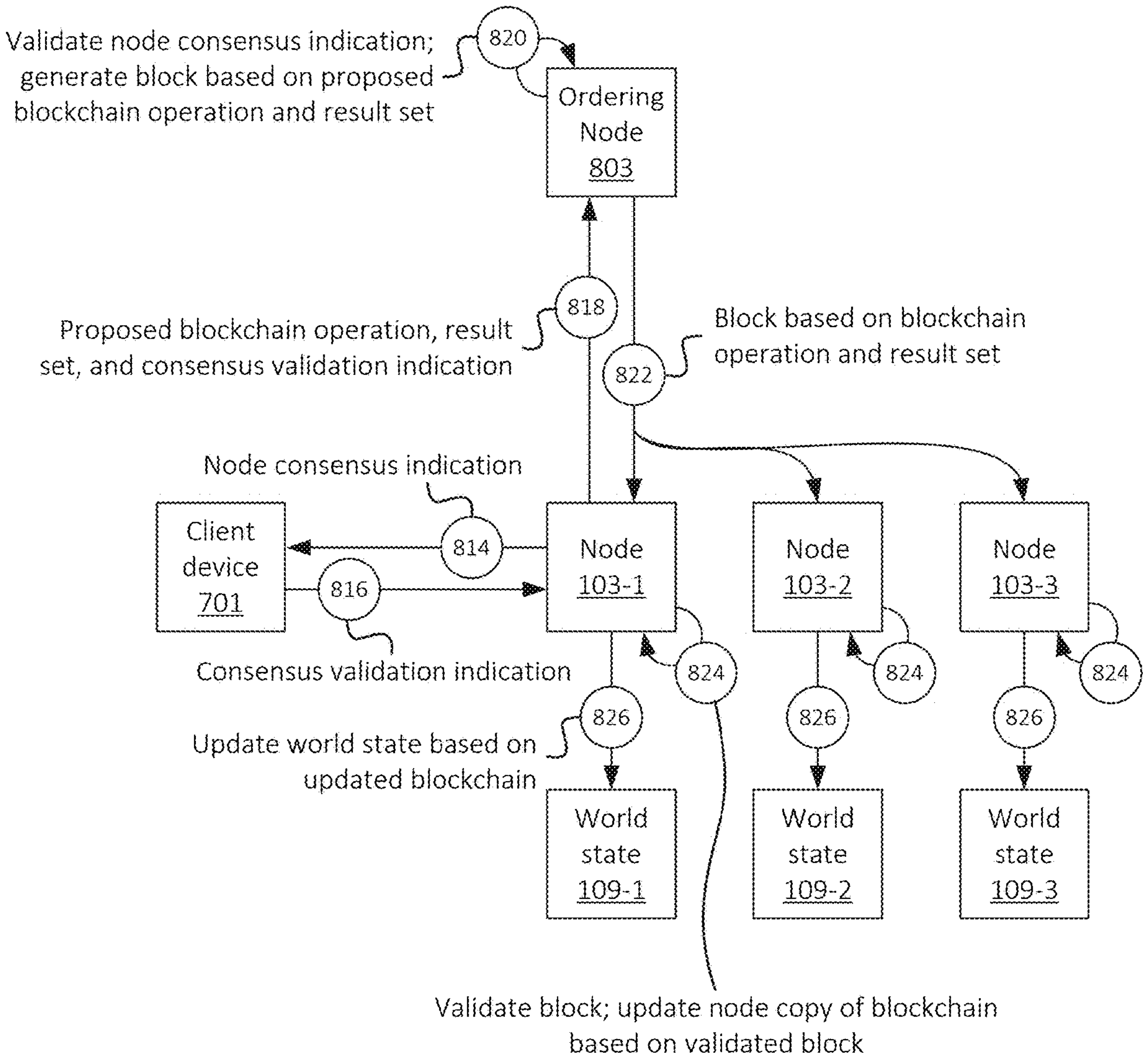

FIGS. 7 and 8 illustrate an example of modifying blockchain 105 and/or world state information based on an interaction with blockchain 105. Although FIGS. 7 and 8 are discussed in the context of nodes 103, some or all of the operations described as being performed by nodes 103 may also be performed by one or more FSNs 107 and/or new node 111.

As shown, a particular node 103-1 may receive (at 702) a proposed blockchain operation (e.g., a request to access or record information to blockchain 105, a request to execute chaincode with respect to blockchain 105, etc.) from a particular source, such as client device 701 (e.g., which may be or may be implemented by a device or system that has access to node 103-1, such as a device or system that has authentication credentials, locator information, etc. via which client device 701 is able to interact with node 103-1). In some embodiments, node 103-1 may receive the proposed blockchain operation from a blockchain management system (e.g., which may receive the proposed blockchain operation from client device 701 and may select node 103-1 out of a group of nodes 103, such as a group of nodes associated with the same channel in a channel-based blockchain system, such as the Hyperledger® Fabric), an ordering node, or other suitable device or system.

Client device 701 may be, for example, an entity associated with blockchain 105 (e.g., may be associated with an address, a "wallet," a decentralized application ("dApp"), etc.). In this example, assume that client device 701 is authorized to initiate, request, etc. the proposed blockchain operation, which may include the modification of one or more values of one or more attributes that are currently associated with blockchain 105, the addition of one or more attributes to blockchain 105, or other suitable interactions. In other examples, node 103-1 and/or some other device or system may verify that client device 701 is authorized to initiate the proposed blockchain operation.

In some embodiments, the proposed blockchain operation (received at 702) may indicate or refer to chaincode recorded to blockchain 105, which may specify one or more inputs (e.g., types of inputs, quantity of inputs, and/or other input parameters), and may also include actions to take with respect to the inputs in order to generate one or more outputs (e.g., chaincode). For example, the proposed blockchain operation may specify particular chaincode (e.g., an address or reference associated with blockchain 105 that includes a record with which the chaincode is associated, a name or identifier of the particular chaincode, or the like) and one or more input values according to input parameters specified by the particular chaincode. In some examples, the proposed blockchain operation may refer to one or more values that have previously been recorded to blockchain 105 (and thus reflected in world state information associated with blockchain 105), such as an interaction that increments or decrements previously recorded values or performs other computations based on previously recorded values. In accordance with embodiments described above, the proposed blockchain operation may refer to one or more values that have been provided to new node 111, such as values provided as world state information 109, a filtered world state, and/or during a prioritized synchronization operation, as discussed above.

Node 103-1 may execute (at 704) the proposed blockchain operation, which may include accessing the one or more values that were previously recorded to blockchain 105. In order to determine the one or more values referred to in the proposed blockchain operation, node 103-1 may access world state information, maintained by node 103-1, to determine such values. Such access may include checking a local cache and/or accessing, via a network, a remote system (e.g., a "cloud" system, a containerized system, etc.) associated with node 103-1 that maintains the world state associated with blockchain 105. The execution (at 704) may be a "simulation" of the proposed blockchain operation, inasmuch as the execution of the proposed blockchain operation and the ensuing result may not yet be recorded to blockchain 105. The interaction may become "final" or "committed" based on validation by one or more other nodes. The result may include a "read-write set," which may include the values of the one or more attributes that were accessed (e.g., the values based on which the interaction was performed), as well as the resulting values after execution of the proposed interaction.

Node 103-1 may provide (at 706) the result set (e.g., the read-write set) based on executing (at 704) the proposed interaction to client device 701. Client device 701 may maintain the result set to, for example, verify and/or to provide approval of the result set before the result set is committed to blockchain 105. Node 103-1 may also provide (at 708) the proposed blockchain operation to one or more other nodes 103 associated with blockchain 105, such as nodes 103-2 and 103-3. In some embodiments, node 103-1 may provide (at 708) the result set generated by node 103-1 to nodes 103-2 and 103-3. Nodes 103-1 through 103-3 may all be associated with the same channel, nodes 103-2 and 103-3 may be specified by the chaincode as validators, and/or nodes 103-2 and 103-3 may otherwise be identified by node 103-1 or an associated blockchain management system as nodes that should validate, endorse, etc. the execution and result of the proposed interaction.

As similarly discussed with respect to node 103-1, nodes 103-2 and 103-3 may execute (at 710), and/or simulate the execution of, the proposed interaction. Accordingly, nodes 103-2 and 103-3 may access one or more values that were previously recorded to blockchain 105 using world state information maintained by nodes 103-2 and 103-3. Nodes 103-2 and 103-3 may validate, verify, etc. the result set generated by node 103-1 by comparing the result set with respective result sets generated by nodes 103-2 and 103-3. Nodes 103-2 and 103-3 may respond (at 712) to node 103-1 with respective result sets generated by nodes 103-2 and 103-3, and/or may respond with an indication, endorsement, etc. (e.g., which may be respectively signed by nodes 103-2 and 103-3) that the result set generated by node 103-1 is valid. Once node 103-1 has received endorsements from at least a threshold quantity of other nodes (e.g., from nodes 103-2 and 103-3, in this example), node 103-1 may determine that a consensus has been reached with respect to the result set for the proposed interaction.

As shown in FIG. 8, node 103-1 may accordingly provide (at 814), to client device 701, an indication that consensus for the result set (provided at 706) has been reached. In some embodiments, client device 701 may validate the consensus (e.g., by evaluating signatures of nodes 103-2 and 103-3) and/or may verify the result set (e.g., by itself executing the proposed interaction). Client device 701 may provide (at 816), to node 103-1, an indication that client device 701 has validated the consensus and/or has verified the result set. In some embodiments, the consensus validation indication may be signed by client device 701, thus securely authenticating the validation by client device 701.

Node 103-1 may provide (at 818) the result set, along with the consensus validation indication and the proposed blockchain operation, to ordering node 803. Ordering node 803 may be a node, associated with the same channel as nodes 103-1 through 103-3, that validates (at 820) the consensus validation indication (e.g., validates signatures associated with client device 701 and/or nodes 103-1 through 103-3) and generates a block, to be recorded to blockchain 105, that includes information regarding the blockchain operation. Such information may include an identifier of client device 701 (e.g., an address, wallet identifier, etc.), identifiers of nodes 103-1 through 103-3 that participated in generating and/or validating the result set based on the blockchain operation, chaincode inputs provided by client device 701, the consensus validation indication, one or more timestamps of the above operations and/or other events, and/or other suitable information associated with the blockchain operation. In some embodiments, the block may be signed by ordering node 803, thus securely authenticating the block creation by ordering node 803. At this point, the blockchain operation may no longer be a "proposed" blockchain operation, as the interaction has been finalized, committed, etc. by ordering node 803. In some implementations, nodes 103-1 through 103-3 may be referred to as "peers," to indicate that such nodes 103-1 through 103-3 are distinct from ordering node 803 (e.g., ordering node 803 performs one or more different operations from the peers).

Ordering node 803 may propagate (at 822) the signed block, including information regarding the finalized blockchain operation initiated by client device 701, to nodes 103-1 through 103-3 and/or other nodes associated with the same channel. Nodes 103-1 through 103-3 may validate (at 824) the block, which may include verifying the signature of ordering node 803, and may accordingly update a respective copy of blockchain 105 as maintained by each one of nodes 103-1 through 103-3. Nodes 103-1 through 103-3 may maintain respective independent copies of blockchain 105, thus providing an element of decentralization to blockchain 105. As such, when adding the block (received at 822), nodes 103-1 through 103-3 may continue to maintain separate copies of the same blockchain 105, including the information regarding the finalized blockchain operation.

Nodes 103-1 through 103-3 may also maintain respective world state information 109 (e.g., world state information 109-1, 109-2, and 109-3). As discussed above, world state information 109 may include a portion of the information stored in blockchain 105, such as the latest version of some or all of the attributes for which information has been recorded to blockchain 105. Nodes 103-1 through 103-3 may accordingly update (at 826) respective copies of world state information 109 based on the received block. For example, in the event that the block includes a change in the value of a particular attribute, nodes 103-1 through 103-3 may update world state information 109-1 through 109-3, respectively, to replace a previous value of the attribute (e.g., a previous version of the attribute) with the newly received value of the particular attribute.

Figure 9:
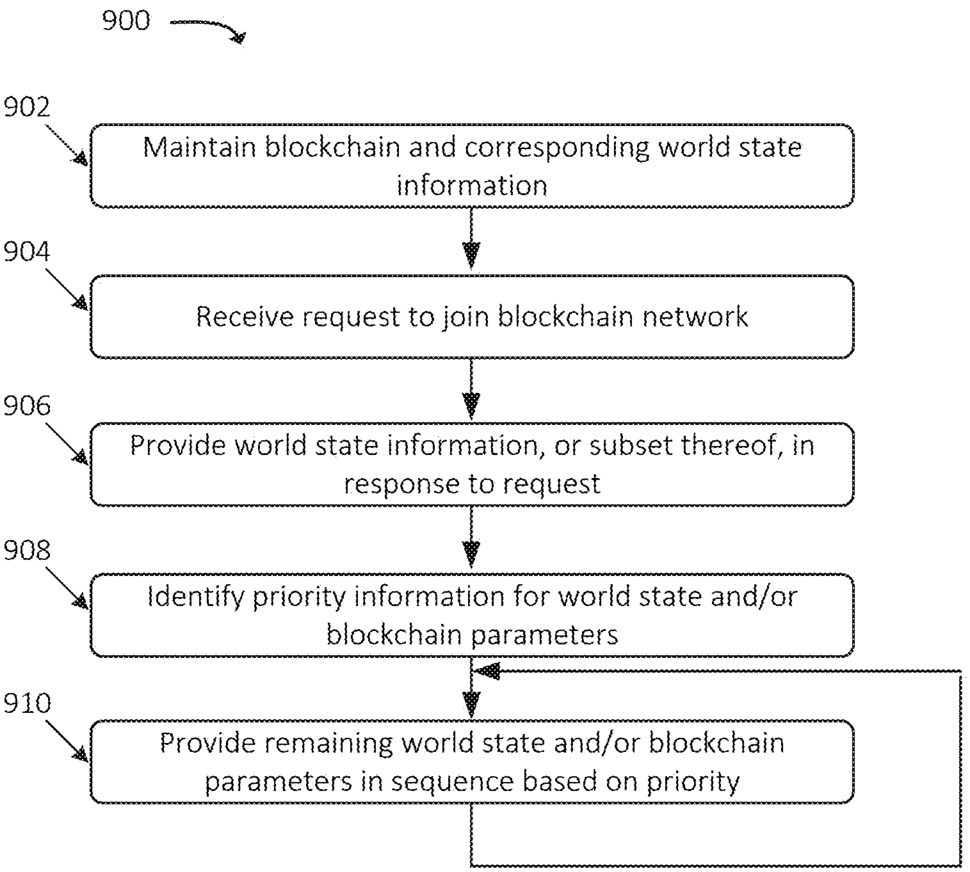
FIG. 9 illustrates an example process for performing a fast synchronization and/or startup of a new node for a blockchain network, in accordance with some embodiments.

FIG. 9 illustrates an example process 900 for performing a fast synchronization and/or startup of a new node for a blockchain network. In some embodiments, some or all of process 900 may be performed by FSN 107 and/or some other suitable device or system.

As shown, process 900 may include maintaining (at 902) blockchain 105 and corresponding world state information 109 associated with blockchain 105. For example, as discussed above, FSN 107 may maintain a local copy of blockchain 105. Additionally, other nodes 103 that are part of blockchain network 101 may also maintain respective local copies of blockchain 105. FSN 107 may also generate, maintain, etc. world state information 109 that is based on blockchain 105. As discussed above, blockchain 105 may include parameters, values, chaincode, etc., and world state information 109 may reflect such parameters, values, chaincode, etc. For example, certain parameters, values, chaincode, etc. may be associated with multiple versions (e.g., where updates or computations may result in new versions), and world state information 109 may reflect a current or valid version of such parameters, values, chaincode, etc. In this sense, world state information 109 may be a "digest" or some other type of subset of the information included in blockchain 105.

Process 900 may further include receiving (at 904) a request to join blockchain network 101. For example, new node 111 may output such request to FSN 107. As discussed above, FSN 107 may perform operations such as providing images, containers, SDKs, configuration files, network information, or the like to new node 111 to facilitate the joining of new node 111 to blockchain network 101.

Process 900 may additionally include providing (at 906) world state information 109, or a subset thereof, to new node 111 in response to the request. For example, the request may specify particular parameters to provide to new node 111 as part of an initial synchronization and/or startup operation. The specified parameters may, in some scenarios, be a subset of the parameters included in world state information 109. Additionally, or alternatively, FSN 107 may identify such subset of parameters independently of the request. For example, the request may, in some implementations, not specify the subset of parameters, and FSN 107 may identify the subset of parameters based on factors such as recency of update of parameters (e.g., may identify parameters that were updated or computed recently, such as within a particular period of time), how often the parameters are accessed or updated (e.g., may identify parameters that are frequently accessed or updated), and/or based on other factors. As discussed above, once new node 111 receives world state information 109 (and/or a subset of world state information 109), new node 111 may be able to immediately begin participating in blockchain operations with respect to blockchain 105, such as executing chaincode that references values included in the provided world state information 109 (or the provided subset of world state information 109), participating in consensus mechanisms that reference values included in the provided world state information 109 (or the provided subset of world state information 109), and/or other suitable operations.

Process 900 may also include identifying (at 908) priority information for world state and/or blockchain parameters. For example, FSN 107 may identify parameters of world state information 109, which were not initially provided (at 906) to new node 111. Additionally, or alternatively, FSN 107 may otherwise identify a priority, sequence, or manner in which blockchain 105 (e.g., the local copy of blockchain 105) should be provided to new node 111. As discussed above, for example, FSN 107 may generate blockchain segments 601 based on blockchain 105, which may correspond to Merkle subtrees or other suitable segments or partitions of blockchain 105.

FSN 107 may provide (at 910) blockchain information, such as blocks, blockchain segments 601, etc. (e.g., which may include metadata, block hashes, block references, or the like) which are not necessarily included in world state information 109, to new node 111 in the identified sequence. In this manner, after new node 111 receives the initial world state information 109 (or subset thereof), new node 111 may continue receiving blockchain information until new node 111 ultimately has its own local copy of blockchain 105 (e.g., in addition to world state information 109 and/or the provided subset thereof).

In one example implementation, blockchain 105 may be used in applications such as verifying call detail records ("CDRs") to detect fraudulent callers, spammers, or the like. An entity, such as a telecommunications provider (e.g., which provides services such as routing or forwarding calls to end users) may generate a CDR for each call (e.g., voice calls), where CDRs include information such as caller information, callee information, timestamp, call duration, or the like. CDRs may be stored in blockchain 105, in order to provide call record access to the telecommunications provider and/or to other entities, such as services that eliminate or reduce the ability of fraudulent callers, spammers, etc. to harass or otherwise contact potential victims. Such entities may, in some implementations, maintain their own respective nodes 103 of blockchain network 101. In the event that a new entity wishes to join blockchain network 101 (e.g., wishes to add their own new node 111 to blockchain network 101), and/or in the event that an existing entity wishes to add a new node 111 to blockchain network 101, embodiments described herein may provide for an expedited startup of such new node 111, in order to facilitate the entity providing its services (e.g., blocking calls or call attempts from fraudulent callers or spammers) as quickly as possible.

Figure 10:
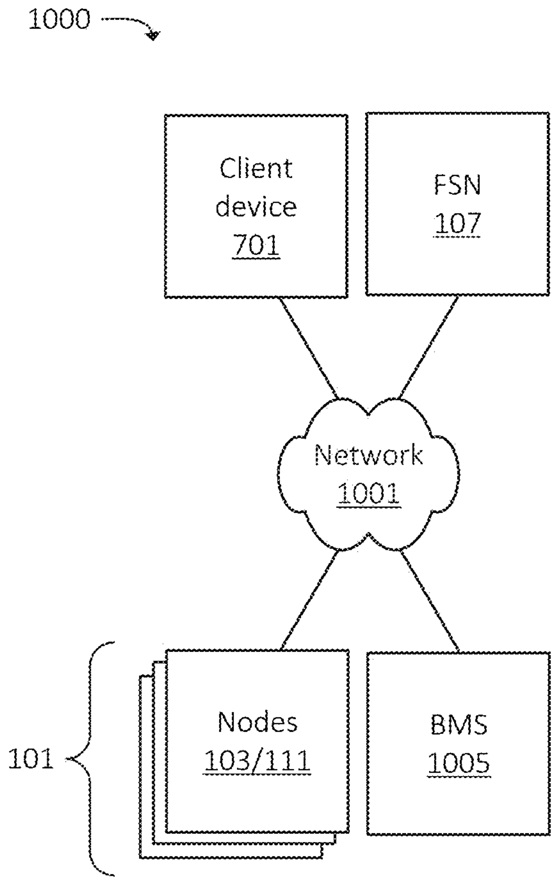
FIG. 10 illustrates an example environment in which one or more embodiments, described herein, may be implemented.

FIG. 10 illustrates an example environment 1000, in which one or more embodiments may be implemented. Environment 1000 may include network 1001, client device 701, Blockchain Management System ("BMS") 1005, and a set of nodes (e.g., one or more nodes 103, one or more new nodes 111, and/or one or more FSNs 107). In some embodiments, environment 1000 may include one or more additional devices or systems communicatively coupled to network 1001 and/or one or more other networks.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. In some implementations, one or more devices of environment 1000 may be physically integrated in, and/or may be physically attached to, one or more other devices of environment 1000. Alternatively, or additionally, one or more of the devices of environment 1000 may perform one or more network functions described as being performed by another one or more of the devices of environment 1000. Elements of environment 1000 may interconnect with each other and/or other devices via wired connections, wireless connections, or a combination of wired and wireless connections. Some or all of the elements of environment 1000 may be implemented by one or more devices, sets of hardware resources, cloud systems, or the like.

Network 1001 may include one or more wired and/or wireless networks. For example, network 1001 may include an IP-based Packet Data Network ("PDN"), a wide area network ("WAN") such as the Internet, a private enterprise network, and/or one or more other networks. Client device 701, BMS 1005, nodes 103, and/or other devices or systems may communicate, through network 1001, with each other and/or with other devices that are coupled to network 1001. Network 1001 may be connected to one or more other networks, such as a public switched telephone network ("PSTN"), a public land mobile network ("PLMN"), and/or another network. Network 1001 may be connected to one or more devices, such as content providers, applications, web servers, and/or other devices, with which client device 701, BMS 1005, nodes 103, and/or other devices or systems may communicate.

Client device 701, BMS 1005, nodes 103, FSN 107, new nodes 111, and/or other devices or systems may be implemented by one or more cloud systems, server devices, or other types of hardware resources. In some embodiments, client device 701, BMS 1005, nodes 103, FSN 107, and/or new nodes 111 may be implemented by or communicatively coupled to a User Equipment ("UE"), which may include a computation and communication device, such as a wireless mobile communication device that is capable of communicating with network 1001. The UE may communicate with network 1001 via a wired or a wireless interface, such as via one or more radio access network ("RANs"), such as a Fifth Generation ("5G") RAN, a Long-Term Evolution ("LTE") RAN, etc. The UE may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device.

Figure 11:
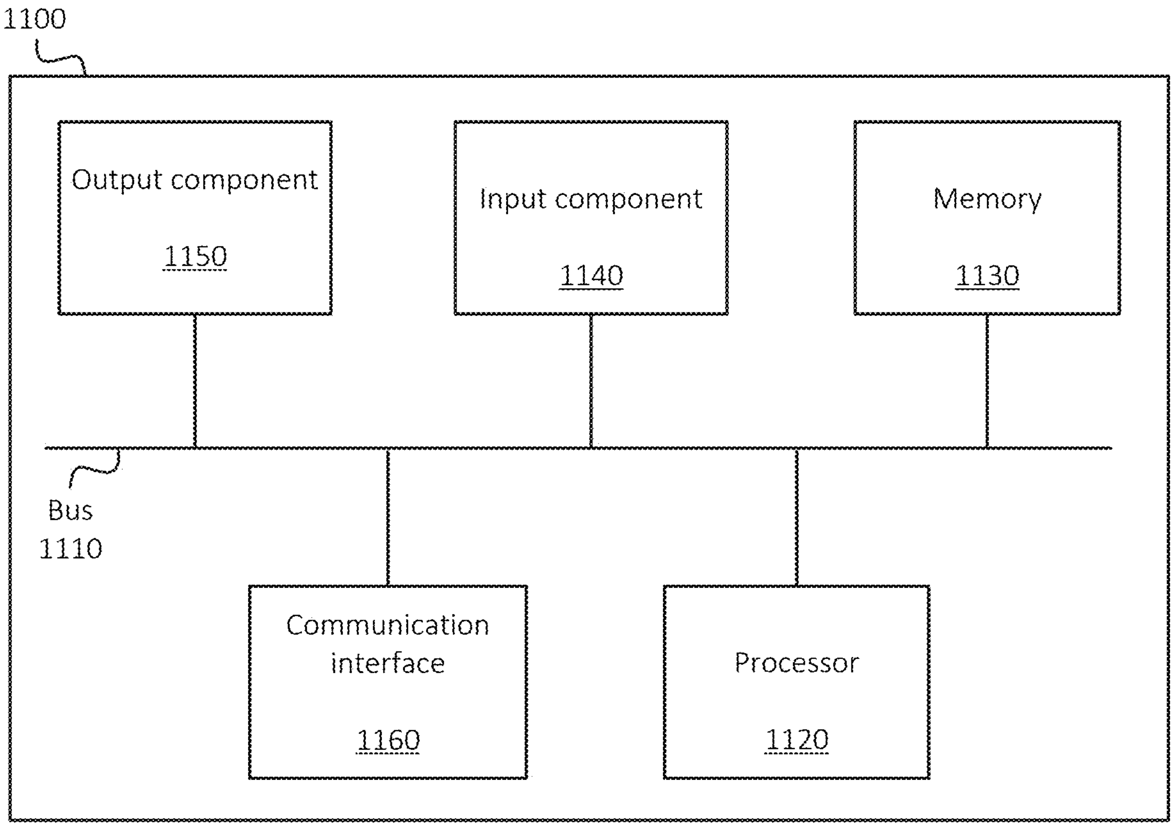
FIG. 11 illustrates example components of one or more devices, in accordance with one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, a set of provisioned hardware resources of a cloud computing system, or other suitable type of hardware that interprets and/or executes instructions (e.g., processor-executable instructions). In some embodiments, processor 1120 may be or may include one or more hardware processors. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100 and/or otherwise receives or detects input from a source external to input component 1140, such as a touchpad, a touchscreen, a keyboard, a keypad, a button, a switch, a microphone or other audio input component, etc. In some embodiments, input component 1140 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems (e.g., via a RAN, a wired network, the Internet, etc.). For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1100 may include more than one communication interface 1160. For instance, device 1100 may include an optical interface, a wireless interface, an Ethernet interface, and/or one or more other interfaces.

Device 1100 may perform certain operations relating to one or more processes described above. Device 1100 may perform these operations in response to processor 1120 executing instructions, such as software instructions, processor-executable instructions, etc. stored in a computer-readable medium, such as memory 1130. A computer-readable medium may be defined as a non-transitory memory device. A memory device may include space within a single physical memory device or spread across multiple physical memory devices. The instructions may be read into memory 1130 from another computer-readable medium or from another device. The instructions stored in memory 1130 may be processor-executable instructions that cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set. Concepts described above may be embodied by, for example, a device, devices, a system, systems, a method, methods, a non-transitory computer-readable medium, and/or non-transitory computer-readable media, as provided for in the claims.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:

one or more processors configured to:

maintain a local copy of a particular blockchain that is associated with a plurality of nodes of a blockchain network, wherein each node of the plurality of nodes maintains a respective local copy of the particular blockchain;

maintain world state information associated with the particular blockchain;

receive a request from a second device to join the blockchain network;

provide, to the second device and based on the received request, at least a subset of the world state information associated with the particular blockchain, wherein the second device performs blockchain operations based on the at least the subset of the world state information; and provide, to the second device and after providing the at least the subset of the world state information, the local copy of the particular blockchain.

2. The first device of claim 1, wherein the request specifies a particular set of parameters, wherein the one or more processors are further configured to:

identify the subset of the world state information based on the particular set of parameters.

3. The first device of claim 2, wherein the world state information includes a plurality of parameters, wherein the particular set of parameters is a subset of the plurality of parameters included in the world state information.

4. The first device of claim 1, wherein providing the local copy of the particular blockchain includes:

generating a plurality of blockchain segments based on the local copy of the particular blockchain; and providing the plurality of blockchain segments to the second device.

5. The first device of claim 4, wherein the one or more processors are further configured to:

identify a measure of priority of each blockchain segment, of the plurality of blockchain segments; and determine a sequence based on the priority of each blockchain segment, wherein providing the plurality of blockchain segments to the second device includes providing the plurality of blockchain segments to the second device in the determined sequence.

6. The first device of claim 5, wherein the one or more processors are further configured to:

identify a measure of priority associated with a plurality of parameters included in the world state information, wherein identifying the measure of priority of each blockchain segment includes:

identifying respective parameters included in each blockchain segment, and identifying the measure of priority of each blockchain segment based on the measure of priority associated with each respective parameter included in each blockchain segment.

7. The first device of claim 1, wherein the blockchain includes a first version and a second version of a particular parameter, and wherein the world state information includes the second version of the particular parameter and does not include the first version of the particular parameter.

8. A non-transitory computer-readable medium, storing a plurality of processor-executable instructions to:

maintain a local copy of a particular blockchain that is associated with a plurality of nodes of a blockchain network, wherein each node of the plurality of nodes maintains a respective local copy of the particular blockchain;

maintain world state information associated with the particular blockchain;

receive a request from a device to join the blockchain network;

provide, to the device and based on the received request, at least a subset of the world state information associated with the particular blockchain, wherein the device performs blockchain operations based on the at least the subset of the world state information; and provide, to the device and after providing the at least the subset of the world state information, the local copy of the particular blockchain.

9. The non-transitory computer-readable medium of claim 8, wherein the request specifies a particular set of parameters, wherein the plurality of processor-executable instructions further include processor-executable instructions to:

identify the subset of the world state information based on the particular set of parameters.

10. The non-transitory computer-readable medium of claim 9, wherein the world state information includes a plurality of parameters, wherein the particular set of parameters is a subset of the plurality of parameters included in the world state information.

11. The non-transitory computer-readable medium of claim 8, wherein providing the local copy of the particular blockchain includes:

generating a plurality of blockchain segments based on the local copy of the particular blockchain; and providing the plurality of blockchain segments to the device.

12. The non-transitory computer-readable medium of claim 11, wherein the plurality of processor-executable instructions further include processor-executable instructions to:

identify a measure of priority of each blockchain segment, of the plurality of blockchain segments; and determine a sequence based on the priority of each blockchain segment, wherein providing the plurality of blockchain segments to the device includes providing the plurality of blockchain segments to the device in the determined sequence.

13. The non-transitory computer-readable medium of claim 12, wherein the plurality of processor-executable instructions further include processor-executable instructions to:

identify a measure of priority associated with a plurality of parameters included in the world state information, wherein identifying the measure of priority of each blockchain segment includes:

identifying respective parameters included in each blockchain segment, and identifying the measure of priority of each blockchain segment based on the measure of priority associated with each respective parameter included in each blockchain segment.

14. The non-transitory computer-readable medium of claim 8, wherein the blockchain includes a first version and a second version of a particular parameter, and wherein the world state information includes the second version of the particular parameter and does not include the first version of the particular parameter.

15. A method, comprising:

maintaining, by a first device, a local copy of a particular blockchain that is associated with a plurality of nodes of a blockchain network, wherein each node of the plurality of nodes maintains a respective local copy of the particular blockchain;

maintaining world state information associated with the particular blockchain;

receiving a request from a second device to join the blockchain network;

providing, to the second device and based on the received request, at least a subset of the world state information associated with the particular blockchain, wherein the second device performs blockchain operations based on the at least the subset of the world state information; and providing, to the second device and after providing the at least the subset of the world state information, the local copy of the particular blockchain.

16. The method of claim 15, wherein the request specifies a particular set of parameters, the method further comprising:

identifying the subset of the world state information based on the particular set of parameters.

17. The method of claim 16, wherein the world state information includes a plurality of parameters, wherein the particular set of parameters is a subset of the plurality of parameters included in the world state information.

18. The method of claim 15, wherein providing the local copy of the particular blockchain includes:

generating a plurality of blockchain segments based on the local copy of the particular blockchain; and providing the plurality of blockchain segments to the second device.

19. The method of claim 18, further comprising:

identifying a measure of priority associated with a plurality of parameters included in the world state information;

identifying a measure of priority of each blockchain segment, of the plurality of blockchain segments, wherein identifying the measure of priority of each blockchain segment includes:

identifying respective parameters included in each blockchain segment, and identifying the measure of priority of each blockchain segment based on the measure of priority associated with each respective parameter included in each blockchain segment; and determining a sequence based on the priority of each blockchain segment, wherein providing the plurality of blockchain segments to the second device includes providing the plurality of blockchain segments to the second device in the determined sequence.

20. The method of claim 15, wherein the blockchain includes a first version and a second version of a particular parameter, and wherein the world state information includes the second version of the particular parameter and does not include the first version of the particular parameter.

* * * * *